3,059,001
**12-HYDROXYSTEARIC ACID ESTERS OF 21-HY-
DROXY STEROIDS OF THE PREGNANE SERIES**
Werner Haede, Hofheim (Taunus), Leonhard Middendorf,
Frankfurt am Main, and Werner Fritsch, Neuenhain
(Taunus), Germany, assignors to Farbwerke Hoechst
Aktiengesellschaft vormals Meister Lucius & Brüning,
Frankfurt am Main, Germany, a corporation of Germany
No Drawing. Filed Sept. 12, 1960, Ser. No. 55,132
4 Claims. (Cl. 260—397.45)

We have found that novel esters of hydroxycarboxylic acids of the pregnane series which exhibit an excellent solubility in oil can be obtained by reacting derivatives of compounds of the pregnane series that are substituted in 21-position, with alkali metal salts of hydroxycarboxylic acids in the presence of an inert organic solvent or suspending agent.

The novel hydroxycarboxylic acid esters are distinguished by an extraordinarily high solubility in oil; by reason of this property they can be clinically used as depot preparations. As is shown in the following comparative table, the products of the present invention are several times more soluble in vegetable oils than the esters known hitherto.

TABLE

| | Solubility at 18° in g/100 cc. | in sesame-oil | in castor-oil | in a mixture of sesame-oil and castor-oil 1:1 |
|---|---|---|---|---|
| I | (a) $\Delta^5$-Pregnene-3-$\beta$,21-diol-20-one-acetate-(21) | 0.25 | 1.77 | 0.6 |
| | $\Delta^5$-Pregnene-3$\beta$,21-diol-20-one-$\beta$-cyclopentylproprionate-(21) | 0.7 | 1.7 | 1.6 |
| | $\Delta^5$-Pregnene-3$\beta$,21-diol-20-one-palmitate-(21) | 0.5 | 0.7 | 0.5 |
| | (b) $\Delta^5$-Pregnene-3$\beta$,21-diol-20-one-12'-hydroxystearate-(21) | 0.9 | 8.9 | 4.1 |
| | $\Delta^5$-Pregnene-3$\beta$,21-diol-20-one-riconoleate-(21) | 2.9 | 8.6 | 8.0 |
| II | (a) $\Delta^4$-Pregnene-17$\alpha$,21-diol-3,11,20-trione-acetate-(21) | 0.48 | 0.60 | 0.53 |
| | $\Delta^4$-Pregnene-17$\alpha$,21-diol-3,11,20-trione-12'-hydroxystearate-(21) | 2.23 | 3.11 | 2.63 |

The alkali metal salts of the hydroxycarboxylic acids used in the process of the present invention can be obtained by mixing an alkali metal alcoholate in a solvent (for example, methanol, or ethanol) at a molecular proportion of 1:1 with the corresponding hydroxycarboxylic acid and precipitating the alkali metal salt from this reaction mixture by the addition of an inert solvent for, example, acetone, benzene, tetrahydrofurane or dioxane. The alkali metal salt is suitably well dried in the vacuum and pulverized in a ball mill.

As compounds of the pregnane series that are substituted in 21-position, there enter into consideration, for example, the 21-halides and the halide-like sulfonates such as the 21-mesylate and 21-tosylate and similar compounds. As regards the halides, the iodides are preferably used for the reaction, but the chlorides and bromides are also suitable. It is also possible to add a small quantity of sodium iodide to the chlorides or bromides and thus intermediarily produce the corresponding iodide. In particular, the following compounds are mentioned by way of example as starting substance, the term "21-halogen" designating one of the halogen atoms mentioned before or one of the halide-like sulfonate radicals:

$\Delta^5$-pregnene-3$\beta$-ol-21-halogen-20-one
$\Delta^4$-pregnene-21-halogen-3,20-dione
$\Delta^4$-pregnene-17-ol-21-halogen-3,11,20-trione
$\Delta^{1,4}$-pregnene-11$\beta$,17$\alpha$-diol-21-halogen-3,20-dione.

As hydroxycarboxylic acids there may be used aliphatic hydroxycarboxylic acids containing 14 to 22 C-atoms, preferably 12-hydroxystearic acid and ricinoleic acid. For the reaction of the 21-derivatives of the pregnane series according to the process of the present invention, there are suitable the salts of the indicated hydroxycarboxylic acids with all alkali metals, but in general it is preferred to use the potassium or sodium salts.

The esterification is suitably effected by dissolving or suspending the mentioned starting substances in acetone, tetrahydrofurane, dimethylformamide or similar inert solvents, and by heating the whole together with an alkali metal salt of a hydroxycarboxylic acid with stirring. It is preferred to use the alkali metal salt in excess and to add an excess quantity of hydroxycarboxylic acid in order to obtain a neutral reaction medium.

The following examples serve to illustrate the invention but they are not intended to limit it thereto:

EXAMPLE 1

$\Delta^5$-*Pregnene-3$\beta$,21-Diol-20-One-12'-
Hydroxystearate-(21)*

30 grams of $\Delta^5$-pregnene-3$\beta$-ol-21-iodine-20-one are dissolved in 400 cc. of acetone and, after addition of 35 grams of the potassium salt of 12-hydroxystearic acid and 1.5 grams of 12-hydroxystearic acid, the whole is refluxed, while stirring, for 8 hours. The reaction mixture is evaporated to dryness under slightly reduced pressure and then extracted with methylene chloride. The methylene chloride solution is shaken with dilute soda solution, dried over sodium sulfate and evaporated to dryness. The residue is recrystallized from 50 cc. of acetone.

The $\Delta^5$-pregnene-3$\beta$,21-diol-20-one-12'-hydroxystearate-(21) is obtained in a very good yield.

The product melts at 65–69° C.

EXAMPLE 2

$\Delta^5$-*Pregnene-3$\beta$,21-Diol-20-One-Ricinoleate-(21)*

28 grams of $\Delta^5$-pregnene-3$\beta$,ol-21-iodine-20-one are dissolved in 200 cc. of acetone and after addition of 28 grams of the potassium salt of ricinoleic acid and 2 grams of ricinoleic acid, the whole is refluxed for 8 hours, with stirring. The product is worked up as described in Example 1.

From 100 cc. of ethanol, there is obtained a wax-like product melting at 54–57° C.

EXAMPLE 3

$\Delta^4$-*Pregnene-21-Ol-3,20-Dione-12'-Hydroxystearate-(21)*

30 grams of $\Delta^4$-pregnene-21-chlorine-3,20-dione are dissolved in 300 cc. of acetone and refluxed, while stirring, for 6 hours together with 35 grams of the potassium salt of 12-hydroxystearic acid, 1.5 grams of 12-hydroxystearic acid and 1.5 grams of sodium iodide. The reaction mixture is worked up in the manner described in Example 1. However, the residue does not crystallize. For purification, the residue is dissolved in ether and the solution is allowed to pass through a column of 30 grams of "acidic" aluminum oxide.

After evaporation of the ether and heating of the residue under reduced pressure, there is obtained the $\Delta^4$-pregnene-21-ol-3,20-dione-12'-hydroxystearate-(21) in the form of an oil.

EXAMPLE 4

$\Delta^4$-*Pregnene-17$\alpha$,21-Diol-3,11,20-Trione-12'-
Hydroxystearate-(21)*

2 grams of $\Delta^4$-pregnene-17$\alpha$-ol-21-chlorine-3,11,20-trione are refluxed, while stirring, for 6 hours with 3 grams of the potassium salt of 12-hydroxystearic acid, 160 mg. of sodium iodide and 20 mg. of hydroxystearic acid in 40 cc. of acetone. The reaction solution is filtered with suction, while hot, from insoluble matter and precipitated with 700 cc. of water containing 100 grams of sodium chloride. The precipitate is filtered and recrystallized twice from methanol.

There is thus obtained in very good yield the $\Delta^4$-pregnene-17$\alpha$,21 - diol-3,11,20-trione-12'-hydroxystearate-(21) melting at 70–75° C.

EXAMPLE 5

$\Delta^{1,4}$-Pregnadiene-11$\beta$,17$\alpha$-21-Triol-3,20-Dione-12'-Hydroxystearate-(21)

An intimate mixture of 4.52 grams of 6-methyl-$\Delta^{1,4}$-pregnadiene-11$\beta$,17$\alpha$-21-triol-3,20-dione-21 - mesylate and 4.23 grams of the potassium salt of 12'-hydroxystearic acid are suspended in 50 ml. of dimethylformamide and heated for 2½ hours, while stirring, to 60° C. and in an atmosphere of nitrogen. The reaction mixture is then stirred into 300 ml. water. The ester is extracted with a mixture of methylene chloride and ether and, after evaporation of the solvent, brought to crystallize by adding petroleum ether. There are thus obtained 6.1 grams of $\Delta^{1,4}$-pregnadiene-11$\beta$,17$\alpha$-21-triol-3,20 - dione-12'-hydroxystearate-(21) having a melting point of 87° C. (Kofler heater). 90 milligrams of the hydroxystearate dissolve at 23° C. in 1 ml. of a mixture of 6.5 parts of sesame-oil and 3.5 parts of castor-oil.

EXAMPLE 6

$\Delta^4$-Pregnene-21-Ol-3,20-Dione-12'-Hydroxystearate-(21)

4.02 grams of $\Delta^4$-pregnene-21-ol-3,20-dione-21-mesylate and 4.20 grams of the potassium salt of 12'-hydroxystearic acid are well mixed and added with 50 ml. of dimethylformamide and then heated for 3½ hours to 60° C., while stirring, under a nitrogen atmosphere. After the reaction mixture has cooled it is stirred into 300 ml. of water. The ester so formed is extracted three times with each time 25 ml. of ether. After drying over sodium sulfate, the extract is concentrated to dryness, first under reduced pressure and finally in a high vacuum, at 80° C. There are obtained 5.7 grams of $\Delta^4$-pregnene-21-ol-3,20-dione-12'-hydroxystearate-(21) in the form of an oil. The compound is miscible to an almost unlimited degree with the mixture of sesame and castor-oil described in the preceding example.

We claim:

1. $\Delta^5$-pregnene-3$\beta$,21 - diol-20-one-12'-hydroxystearate-(21).

2. $\Delta^4$-pregnene-21-ol-3,20 - dione-12'-hydroxystearate-(21).

3. $\Delta^4$-pregnene-17$\alpha$,21-diol - 3,11,20-trione-12'-hydroxystearate-(21).

4. $\Delta^{1,4}$-pregnadiene - 11$\beta$,17$\alpha$ - 21-triol-3,20-dione-12'-hydroxystearate-(21).

References Cited in the file of this patent

UNITED STATES PATENTS 2,933,516     Jones et al. _____ Apr. 19, 1960

OTHER REFERENCES

Journal of American Pharmaceutical Association, Cataline et al., vol. 43, pages 558–561, September 1954.

Groggins: Unit Processes in Organic Synthesis, 5th ed., 1958, page 718.